United States Patent [19]
Pluyter et al.

[11] Patent Number: 5,248,461
[45] Date of Patent: Sep. 28, 1993

[54] PROCESS OF MAKING MICROPOROUS FILMS OF UHMWPE

[75] Inventors: Pieter B. Pluyter, Utrecht, Netherlands; Paul Smith, St. Barbara, Calif.; Lambert H. T. Van Unen, Heerlen; Hendrikus J. J. Rutten, Maastricht, both of Netherlands

[73] Assignee: Stamicarbon B.V., Netherlands

[21] Appl. No.: 754,158

[22] Filed: Sep. 3, 1991

Related U.S. Application Data

[63] Continuation of Ser. No. 464,026, Jan. 12, 1990, abandoned.

[30] Foreign Application Priority Data

Jan. 13, 1989 [NL] Netherlands ............... 8900078

[51] Int. Cl.$^5$ ............................................. B29C 67/20
[52] U.S. Cl. ......................... 264/41; 264/154; 264/204; 264/211.13; 264/288.8; 264/289.6; 264/290.2; 264/344
[58] Field of Search ............ 264/41, 154, 204, 211.13, 264/288.8, 289.6, 290.2, 344

[56] References Cited

U.S. PATENT DOCUMENTS

| | | |
|---|---|---|
| 3,308,073 | 3/1967 | Kepple. |
| 4,247,498 | 1/1981 | Castro ............................ 264/41 |
| 4,255,376 | 3/1981 | Soehngen ................... 264/154 X |
| 4,539,256 | 9/1985 | Shipman ...................... 264/41 X |
| 4,588,633 | 5/1986 | Kono et al. ...................... 428/220 |
| 4,734,196 | 3/1988 | Kono et al. .................. 264/41 X |
| 4,778,601 | 10/1988 | Lopatin et al. ............ 210/500.27 |
| 4,874,567 | 10/1989 | Lopatin et al. ............ 264/288.8 X |

FOREIGN PATENT DOCUMENTS 283187 9/1988 European Pat. Off. .

Primary Examiner—Leo B. Tentoni
Attorney, Agent, or Firm—Cushman, Darby & Cushman

[57] ABSTRACT

The invention relates to microporous films of ultrahigh molecular weight polyethylene and to a process for the preparation thereof by forming a solution of UHMWPE in an evaporable solvent into a film and evaporating the solvent from the film at a temperature below the dissolution temperature, the shrinking tendency occurring in the film being prevented in at least one direction in the plane of the film.

6 Claims, No Drawings

PROCESS OF MAKING MICROPOROUS FILMS OF UHMWPE

This is a continuation of application Ser. No. 07/464,026, filed on Jan. 12, 1990, which was abandoned upon the filing hereof.

BACKGROUND OF THE INVENTION

This invention relates to a process for the preparation of microporous films of ultrahigh molecular weight polyethylene by forming a solution thereof into a film and removing the solvent from the film, as well as to films that can be obtained in this way.

In the context of this invention the expression "(micro)porous film" is understood to mean not only a film in the ordinary, general sense, but also a tube, a tubular film, one or more hollow filaments with micropores.

Such a process is described in patent application WO-A-86/02282. The solvent should be a porogene, which according to said patent application should be understood to be a material that can be mixed with ultrahigh molecular weight polyethylene, for the sake of brevity denoted as UHMWPE, be heated to form a solution of porogene and polymer, and subsequently cooled to form a mixture comprising a separate phase that is rich in porogene. According to said patent application this phase can be isolated from the mixture and a microporous structure can be made of it. When a solution of UHMWPE in such a porogene is extruded to a film, phase separation is stated to occur in the film upon cooling. The porogene must then be removed from the film.

Though the above-mentioned patent application mentions aliphatic, alicyclic and aromatic hydrocarbons as possible solvents, in the examples use is made exclusively of a mineral oil having a viscosity of 60 cSt at 40° C., i.e a dynamic viscosity of about 52 mPa.s at 40° C. An oil having such a viscosity contains considerable amounts of high-boiling hydrocarbons, a large part of which cannot, or only with decomposition, be distilled at atmospheric pressure. The mineral oil can be removed from the film only by extraction, as also described in the examples of WO-A-86/02282. In doing so, the extractant needs to be refreshed at least once, and after extraction any residual extractant is to be removed from the film by evaporation. Such a process not only is laborious, time-consuming and expensive, but mineral oil extraction is not complete, either, and the residual amounts of mineral oil in the film are not small, which is undesirable.

The preparation of porous films of UHMWPE on the basis of UHMWPE solutions is described also in EP-A-160.551. Though it is stated there that the solvent may be any solvent capable of dissolving the polyethylene to a sufficient extent, for instance aliphatic or cyclic hydrocarbons, such as nonane, decane, undecane, dodecane, decalin and paraffin oils or mineral oil fractions with corresponding boiling points, but in the examples use is made exclusively of a liquid paraffin having a viscosity of 64 cSt at 40° C. In this method, otherwise already complicated, the solvent, preferably a nonvolatile solvent, must also be extracted from the film using a readily evaporating solvent, which has the disadvantages already outlined in the above.

SUMMARY OF THE INVENTION

Now a process has been found for the preparation of microporous films of ultrahigh molecular weight polyethylene by forming a solution thereof into a film and removing the solvent from the film by - and this characterizes the invention - forming a solution of UHMWPE in an evaporable solvent into a film and evaporating, at a temperature below the dissolution temperature of the UHMWPE in said solvent, that solvent from the film, and during evaporation preventing the shrinking tendency occurring in the film in at least one direction in the plane of the film, or even stretching the film in one or more directions in the plane of the film.

Evaporable solvents in this context are understood to be solvents having a boiling point below about 300° C., preferably below 250° C., and most preferably below 225° C. Generally, the solvent is a hydrocarbon, which optionally may be singly or multiply halogenated, such as toluene (b.p. 110.6° C.), xylenes (b.p. 138°–144° C.), monochlorobenzene (b.p. 132° C.), nonane (b.p. 151° C.), decane (b.p. 174° C.), undecane (b.p. 196° C.), dodecane (b.p. 216° C.), tetralin (b.p. 206° C.), decalin (b.p. trans 187° C., cis 196° C.). Solvents consisting of one or some hydrocarbons are expensive. Their use does not yield special advantages and therefore is not preferred. Petroleum fractions generally are little expensive, and therefore they can be used as solvents in so far as their boiling range does not exceed about 300° C. Kerosene, which consists mainly of $C_{12}$–$C_{16}$ hydrocarbons and has a boiling range of 200° C.–300° C., can be used, but fractions boiling at a somewhat lower temperature, such as fractions composed mainly of $C_6$–$C_{12}$ hydrocarbons and having a boiling range of 85° C.–200° C., mostly are better suitable, though the lowest-boiling components of these fractions are somewhat less desirable. For this reason, heavy fraction types are preferred. Solvents that are particularly preferred are tetralin and decalin, and most preferably decalin is used as solvent. To anyone skilled in the art it will be perfectly clear that the selection of a certain solvent does not constitute an aspect of the invention and that processing by the process according the invention of solutions of UHMWPE in any other suitable solvent, not indicated here, is within the scope of the invention.

DETAILED DESCRIPTION OF THE INVENTION

For the preparation of films from UHMWPE solutions homogeneous solutions are to be started from. The continuous preparation of homogeneous UHMWPE solutions is difficult, and the difficulty increases with increasing molecular weight of the UHMWPE, decreasing viscosity of the solvent, and increasing desired concentration of the solution. Dissolution of UHMWPE in a solvent such as paraffin oil or mineral oil having a viscosity of at least 50 mPa.s at 40° C. is considerably less difficult than in evaporable solvents having a viscosity of at most 5 mPa.s at 40° C. According to the state of the art therefore use is made predominantly of solutions in paraffin oil, etc. Until recently, continuous preparation of UHMWPE solutions, for instance in an extruder, either was impossible or possible only with difficulty when applying solvents having a relatively high viscosity (more than 50 mPa.s at 40° C.). Continuous dissolving in an extruder of UHMWPE in low-viscosity solvents having a viscosity of less than 5 mPa.s at 40° C has become possible only recently by what is disclosed in EP-A-183.285. Application of this process yields the advantage that the solution can be prepared and extruded into film, or otherwise processed into film, in one continuous operation. However, the invention is not restricted to such a process, and to one skilled in the art it will be perfectly clear that solutions prepared in another way can also be processed into microporous films.

The dissolution temperature is the temperature above which the polyethylene in question can be dissolved homogeneously in the solvent. When this solution is cooled to below the dissolution temperature, gelling will take place. There may be a limited spread between dissolution temperature and gelling temperature. If that is the case, in the process according to the subject invention the solvent is evaporated from the film at a temperature below the lower one of these temperatures.

In the context of the subject invention ultrahigh molecular weight polyethylene, for the sake of simplicity denoted as UHMWPE, is understood to be polyethylene with a weight-average molecular weight of at least $4 \times 10^5$ kg/kmol, preferably at least $8 \times 10^5$ kg/kmol, and most preferably at least $1 \times 10^6$ kg/kmol. High molecular weights are desirable because of the physical and mechanical properties of high-molecular weight polyethylene, which allow of the preparation of strong films with high porosities. For carrying out the subject process the molecular weight is not critical. The viscosity of UHMWPE solutions, converted to the same concentration, increases with the molecular weight, and as the molecular weight is higher processing of the solutions becomes more difficult. For this reason usually no polyethylene with a molecular weight in excess of $15 \times 10^6$ kg/mol will be applied, though in principle the subject process can be carried out using polyethylene with a molecular weight in excess of $15 \times 10^6$ kg/kmol. The weight-average molecular weight can be determined by known methods, for instance by gel permeation chromatography and/or light scattering.

The UHMWPE to be used in the subject process preferably is linear polyethylene as can be prepared by generally known preparation methods using transition metal catalysts. The UHMWPE may contain minor amounts of preferably at most 5 mol % of one or more copolymerized other alkenes, such as propylene, butene, pentene, hexene, 4-methyl-pentene-1, octene, etc. The UHMWPE may also be mixed with minor amounts of preferably at most 25 wt. % of one or more other polymers, in particular an alkene polymer, such as polypropylene, polybutene, propylene copolymerized with minor amounts of ethylene, etc. The UHMWPE may contain customary additives, such as stabilizers, colourants, pigments, fillers, etc.

The UHMWPE concentration in the solutions may vary within broad limits and generally a concentration between 2 and 30 wt. % will be chosen, mainly for practical considerations. From solutions with less than about 2 wt. % UHMWPE such fragile films are obtained that further processing becomes extremely difficult. On the other hand, processing of solutions with a concentration of more than 25 wt. %, and in particular more than 30 wt. %, increasingly becomes difficult. Concentrated solutions with UHMWPE concentrations of 30 wt. % or higher therefore are not preferred, though the use of such solutions is possible and therefore is within the scope of the subject invention.

The UHMWPE solution is converted into a film, consisting of the solution. This can be effected in various ways, for instance by spinning using a spinneret with a very wide, slit-shaped die, by extruding, or by casting onto a roll or belt.

During and/or after processing of a UHMWPE solution into a film, the temperature is reduced to such an extent that gelling occurs in the film, resulting in a structure that is sufficiently strong and stable for further processing. Though cooling to ambient temperature or even lower is possible, it will be perfectly clear that to obtain a cost-efficient process it is most desirable that the solvent can rapidly evaporate from the film, and for this reason in general the temperature will preferably be kept as high as possible. Further measures to promote solvent evaporation, such as passing a heated gas, for instance air, over the film or use of reduced pressure, of course are within the scope of the invention.

If the shaping technique used allows this, if desired pre-stretching can be applied, which implies that the linear velocity at which the gel-shaped film is taken up or transported differs from the linear velocity at which the film is being formed from the solution. When, for instance, extrusion is applied, the latter velocity is the linear velocity at which the solution leaves the extrusion die. The pre-stretching ratio in this context is defined as the quotient of the above-mentioned transport or take-up rate and the outlet velocity.

During solvent evaporation the film tends to shrink. According to the subject invention this shrinking is to be prevented in at least one direction in the plane of the film. To this end the film can in a simple manner be clamped. When the film is clamped in two directions, its thickness is the only dimension that can decrease and that is in effect decreased. Something similar holds for, for instance, tubular films and hollow filaments.

In the process according to the invention it is not only possible to prevent shrinking, but even to stretch in one or two directions already during solvent evaporation.

It is also possible in the process according to the invention to subject the film to a stretching treatment in one or more directions after the solvent has been evaporated from the film. Said stretching of the solvent-free film may if desired take place at a higher temperature than the one used for stretching during solvent evaporation, provided this higher temperature remains below the melting point of the UHMWPE.

The increase in film area resulting from stretching, both during and after solvent evaporation, is attended by a decrease in the film thickness. With the thickness, also the absolute strength of the stretched film decreases, so that the maximum attainable area increase is limited in that the film cannot withstand the stretching force at a certain thickness. For gel films with a thickness after extrusion of 1 mm the maximum attainable area increase is about 70×, which may rise to about 100–120× when use is made of thicker extruded gel films.

Microporous films or membranes have been used for various applications, for instance as separators for cells, diaphragms for electrolytic capacitators, for filters and for vapour-permeable but waterproof clothing. It has now been found that film according to the invention can be used to advantage also as sealing material between, for instance, the internal and external thread of screwed connections of, for instance, tubes carrying gas and/or liquids. For such an application it is therefore preferred to prepare film according to the subject invention in the form of tapes of the desired width. Preferably, film according to the invention that is meant for such an application is to a small extent stretched mono- or biaxially. A stretching ratio of 1 to 2, and preferably of 1 to 1.5, in one or two directions is desirable. Surprisingly, it has been found that such a film is very flexible and can easily be provided around a screw thread at room temperature, with a little tension being applied. It is surprising that this porous material yields very good seals.

An advantage of the above-mentioned sealing material according to the subject invention is that polyethylene is not toxic, in contrast to the polytetrafluoroethylene so far often used for sealing purposes, which releases halogenated hydrocarbons upon decomposition.

The films that can be obtained according to the subject invention possess excellent physical and mechanical properties, notably a good pore structure. A special advantage also is that using the subject process it is easy to prepare films in which solvent residues are no longer present, or at least not present in demonstrable quantities.

The invention will be elucidated further by the following examples without, however, being restricted thereto.

The values given in the examples for tensile strength, modulus, elongation at breaking, porosity and moisture vapour transmission ratio are determined in the following manners.

The tensile strength, the modulus and the elongation at breaking are determined on a sample of 25 mm×5 mm according to ASTM standard D 882 using a tensile testing machine developed by DSM, with a testing speed of 25 mm/min.

The porosity is determined from the film density using the formula porosity (%)=(1−film density/bulk density)×100% where the bulk density is the density of the starting material, which for the UHMWPE applied is 0.96.

The film density is determined on the basis of geometry as the quotient of film mass and volume. The volume is determined using a pycnometer according to ASTM standard D 792, water being used as liquid, or is calculated from length, width and thickness, the thickness being determined by means of a Millitron mechanical thickness meter with an accuracy of 0.1 μm.

The moisture vapour transmission ratio is determined in conformity with ASTM standard E96 BW.

EXAMPLE 1

A linear polyethylene with a weight-average molecular weight of $2 \times 10^6$ kg/kmol (Himont 312$^R$) was dissolved to a concentration of 2 wt. % at a temperature of 160° C. in decalin until a homogeneous solution was obtained. The solution is poured out into a metal tray at room temperature, upon which a gel film is formed. The solvent contained in the gel film thus obtained is evaporated at room temperature, with the length and width of the film being kept constant. After this treatment the film porosity is 27%.

The above procedure is repeated, now with xylene as solvent. The resulting film has a porosity of 30%.

EXAMPLE 2

A linear polyethylene with a weight-average molecular weight of $2 \times 10^6$ kg/mol (Himont 312$^R$) was dissolved to a concentration of 10 wt. % in decalin until a homogeneous solution was obtained by extruding such a mixture of polyethylene and decalin using a twin-screw extruder at a temperature of 180° C. The extruder head is provided with a nozzle with an extrusion slot measuring 400×1 mm, through which the homogeneous 15 wt. % solution in decalin is extruded into a tape that is cooled in a water bath kept at 20° C. From the gel film thus obtained the solvent is evaporated in an oven kept at 70° C., the film length and width being kept constant. After this treatment the film porosity is 46%, while the thickness is 0.16 mm.

EXAMPLE 3

The procedure described in example 2 is repeated, except that now the polyethylene is dissolved in decalin to a concentration of 15 wt. %. During solvent evaporation both the length and width of the film are kept constant. A film having a porosity of 52% is obtained. Its thickness is 0.30 mm.

EXAMPLE 4

The procedure described in example 2 is repeated, except that now the polyethylene is dissolved in decalin to a concentration of 20 wt. %. During solvent evaporation both the length and width of the film are kept constant. A film having a porosity of 48% is obtained. Its thickness is 0.36 mm.

EXAMPLE 5

The procedure described in example 2 is repeated, except that now the extruder head is equipped with an extrusion slot measuring 400 mm×3 mm. During solvent evaporation both the length and the width of the film are kept constant. A film with a porosity of 58% and a thickness of 1.3 mm is obtained.

EXAMPLE 6

The procedure described in example 4 is repeated, except that during solvent removal now only the film length is kept constant. A film with a porosity of 28% and a thickness of 0.47 mm is obtained.

EXAMPLE 7

The procedure described in example 6 is repeated, except that now solvent evaporation takes place at 30° C. A film with a porosity of 23% and a thickness of 0.47 mm is obtained.

EXAMPLE 8

The procedure described in example 4 is repeated, but now solvent evaporation takes place at 30° C. and during solvent evaporation the film is simultaneously stretched to 3 times its original length and width. Of the resulting film the thickness, the porosity, the tensile strength, the modulus and the elongation at breaking are presented in Table 1.

EXAMPLE 9

The procedure described in example 8 is repeated, except that now during solvent evaporation the film is stretched 3 × in longitudinal or machine direction (MD) direction and the dried film is subsequently stretched 3 × in transverse direction (TD). Of the resulting film the thickness, the porosity, the tensile strength, the modulus and the elongation at breaking are presented in Table 1.

EXAMPLE 10

The procedure described in example 8 is repeated, except that during solvent evaporation the film is stretched 3 × in transverse direction, and the dried film is subsequently stretched 3 × in the machine direction. Of the resulting film the thickness, the porosity, the tensile strength, the modulus and the elongation at breaking are presented in Table 1.

TABLE 1

|  | Example number | | |
|---|---|---|---|
|  | 8 | 9 | 10 |
| Thickness (μm) | 59 | 52 | 68 |
| Porosity (%) | 34 | 42 | 42 |
| Tensile strength (MPa) MD/TD | 53/52 | 58/69 | 47/40 |
| Modulus (MPa) MD/TD | 910/900 | 980/1130 | 750/720 |
| Elongation at breaking (%) MD/TD | 265/181 | 189/158 | 145/181 |

EXAMPLE 11

The procedure described in example 3 is repeated, but now after solvent evaporation the film is simultaneously stretched to 2 times its original length and width. Besides the porosity and the thickness also the moisture vapour transmission ratio, the pore size distribution as well as the tensile strength and the elongation at breaking, both in machine direction and in transverse direction, were measured. The data obtained are included in Table 2.

EXAMPLE 12

The procedure described in Example 2 is repeated, except that after solvent evaporation the film is simultaneously stretched to 2 times its original length and width. The film properties enumerated in example 11 are included in Table 2.

EXAMPLE 13

The procedure described in example 4 is repeated, except that after solvent evaporation the film is now simultaneously stretched to 2 times its original length and width. The film properties enumerated in example 11 are included in Table 2.

EXAMPLE 14

The procedure described in Example 13 is repeated, but now after solvent evaporation the film is simultaneously stretched to 3 times its original length and width. The film properties enumerated in example 11 are included in Table 2.

EXAMPLE 15

The procedure described in Example 13 is repeated, except that after solvent evaporation the film is now simultaneously stretched to 8 times its original length and width. The film properties are presented in Table 2.

TABLE 2

|  | Example number | | | | |
|---|---|---|---|---|---|
|  | 11 | 12 | 13 | 14 | 15 |
| Porosity (%) | 78 | 75 | 66 | 54 | 86 |
| Thickness (μm) | 210 | 150 | 140 | 60 | 38 |
| Moisture vapour transmission rate (g/m² · 24 h) | 5325 | 3390 | 4470 | 2960 | 7320 |
| Pore size distribution | 1.2–0.5 | 1.4–0.6 | 0.6–0.2 | 0.2–0.1 | 0.2–0.1 |
| Tensile strength (MPa) MD/TD | 7.5/6.5 | 8/6.5 | 18/15 | 38/30 | 27/37 |
| Elongation at breaking (%) MD/TD | 16/19 | 16/25 | 40/25 | 20/35 | 330/260 |

EXAMPLE 16

The procedure described in example 2 is repeated, except that after solvent evaporation now stretching in sequence in the film plane is applied, both first in machine direction, followed by stretching in transverse direction, and the other way round, no film shrinkage being allowed in the direction in which no stretching takes place. The film properties for a number of combinations of stretching ratios are included in Table 3.

TABLE 3

|  | Stretching | | | |
|---|---|---|---|---|
|  | 3 × MD 3 × TD | 6 × MD 3.8 × TD | 2.7 × TD 3.6 × MD | 4.5 × TD 5.2 × MD |
| Thickness (μm) | 120 | 45 | 115 | 45 |
| Porosity (%) | 85 | 86 | 88 | 89 |
| Moisture vapour transmission ratio (g/m² · 24 h) | 5960 | 7200 | 6580 | 6100 |
| Tensile strength (MPa) MD/TD | 4.8/8.3 | 3.0/12.8 | 7.2/7.7 | 7.8/13.5 |

EXAMPLE 17

The method described in example 16 is repeated except that now use is made of films prepared according to the procedure described in example 6. The film properties for a number of combinations of stretching ratios are included in Table 4 (MD stretching followed by TD stretching) and Table 5 (TD stretching followed by MD stretching).

TABLE 4

|  | MD stretching followed by TD stretching | | | | |
|---|---|---|---|---|---|
|  | Stretching | | | | |
|  | 2 × 2 | 4 × 4 | 4 × 8 | 6 × 8 | 7 × 8 |
| Thickness (μm) | 241 | 97 | 78 | 48 | 50 |
| Porosity (%) | 61 | 79 | 82 | 85 | 86 |
| Moisture vapour transmission ratio (g/m² · 24 h) | 1960 | 3245 | 4170 | 6795 | 6810 |
| Elongation at breaking (%) MD/TD | 140/760 | 30/196 | 14/50 | 23/23 | 22/40 |
| Tensile strength (MPa) MD/TD | 22/21 | 34/22 | 6/46 | 35/41 | 32/27 |
| Modulus (MPa) MD/TD | 240/150 | 290/260 | 100/480 | 30/480 | 320/400 |

TABLE 5

| | TD stretching followed by MD stretching Stretching | |
|---|---|---|
| | 3 × 3 | 5 × 5 |
| Thickness (μm) | 145 | 111 |
| Porosity (%) | 73 | 86 |
| Moisture vapour transmission ratio (g/m² · 24 h) | 2220 | 4245 |
| Elongation at breaking (%) MD/TD | 27/483 | 10/143 |
| Tensile strength (MPa) MD/TD | 35/26 | 28/26 |
| Modulus (MPa) MD/TD | 360/180 | 550/170 |

EXAMPLE 18

The method described in Example 6 is repeated, except that during extrusion pre-stretching is applied. The film properties are as shown in Table 6.

TABLE 6

| | Pre-stretching | | |
|---|---|---|---|
| | 1 × | 2 × | 3 × |
| Thickness μm | 585 | 380 | 370 |
| Porosity (%) | 21 | 40 | 53 |

EXAMPLE 19

The method described in example 5 is repeated, but now during extrusion pre-stretching is applied. After solvent evaporation the films are stretched at 30° C. to 3 times their original length and width. Table 7 presents the film properties.

TABLE 7

| | Pre-stretching | | |
|---|---|---|---|
| | 2 × | 4 × | 6 × |
| Thickness (μm) | 261 | 97 | 57 |
| Porosity (%) | 89 | 90 | 87 |
| Moisture vapour transmission rate (g/m² · 24 h) | 4675 | 5385 | 6475 |

EXAMPLE 20

A linear polyethylene with a weight-average molecular weight of $1.5 \times 10^6$ (Hostalen GUR 412$^R$) is dissolved in a twin-screw extruder to a 15 wt. % solution in decalin. The solution is extruded through an extrusion die with an opening of 250×1 mm. The film is cooled in a water bath kept at 20° C., and subsequently the solvent is removed by evaporation in an oven kept at 70° C., the film length being kept constant. After solvent evaporation the film is stretched 2×2 biaxially at 120° C. After this, the film is cut longitudinally into strips that are 2 cm wide.

At room temperature the external thread of a pipe section of a pressure gauging device is provided with a number of windings of such a strip. The pipe section provided with the strip windings is screwed into the mating section of the pressure gauging device, upon which a pressure of 4 bar is applied during 60 minutes in the pressure gauging device. No decrease in pressure could be observed.

COMPARATIVE EXAMPLE

The procedure described in example 1 was repeated, except that during solvent evaporation the film was not fixed, so that the shrinking tendency in the film was in no way prevented. After solvent evaporation the film porosity is 7%. After 2×2 biaxial stretching of the film at 120° C., a clear, non-porous film is obtained.

We claim:

1. Process for the preparation of microporous films of ultrahigh molecular weight polyethylene (UHMWPE) by forming a film from a solution of ultrahigh molecular weight polyethylene in an evaporable and dissolving solvent and removing that solvent from the film, wherein said solvent is selected from the group consisting of decalin and tetralin, the solution of UHMWPE in the evaporable and dissolving solvent is formed into a film and the solvent is evaporated from the film at a temperature below the dissolution temperature and the shrinkage which can then occur in the film during evaporation is prevented in at least one direction in the plane of the film or the film is stretched in one or more directions in the plane of the film, such that porosity of the film is effected by the shrinkage prevention or by the stretching, the stretching occurring during evaporation of the solvent, after evaporation of the solvent, or a combination thereof.

2. Process according to claim 1, wherein use is made of a solution in a solvent having a boiling point under atmospheric pressure of at most 300° C.

3. Process according to claim 1, wherein use is made of a solution in a solvent having a boiling point under atmospheric pressure of at most 250° C.

4. Process according to claim 1, wherein use is made of a solution in a solvent having a boiling point under atmospheric pressure of at most 225° C.

5. Process according to claim 1, wherein use is made of a 2-30 wt. % solution of ultrahigh molecular weight polyethylene.

6. Process according to claim 1, wherein after solvent evaporation from the film, the film is stretched in one or more directions, optionally at an elevated temperature, but below the melting point of the UHMWPE.

* * * * *